United States Patent [19]

Payeur

[11] 4,046,042

[45] Sept. 6, 1977

[54] CIRCULAR SHEAR CUTTING DEVICE

[75] Inventor: Marcel Payeur, Plessisville, Canada

[73] Assignee: Forano Limitee, Quebec, Canada

[21] Appl. No.: 669,150

[22] Filed: Mar. 22, 1976

[51] Int. Cl.[2] .......................... B27M 1/00; B23D 19/04; B26D 1/24

[52] U.S. Cl. .......................................... 83/418; 83/423; 83/435.2; 83/500; 83/503; 144/246 B

[58] Field of Search ....................... 83/418, 423, 435.2, 83/500, 503, 411, 425.3, 430; 144/246 B, 312, 34 E

[56] References Cited

U.S. PATENT DOCUMENTS

| | | | |
|---|---|---|---|
| 180,872 | 8/1876 | Hancock | 144/246 B |
| 1,481,712 | 1/1924 | Huckins | 144/246 B |
| 3,304,972 | 2/1967 | Kotesovec et al. | 144/312 |
| 3,491,807 | 1/1970 | Underwood | 83/423 |
| 3,500,882 | 3/1970 | Tanguay | 144/312 R |
| 3,518,913 | 7/1970 | Fountain | 83/503 |
| 3,756,109 | 9/1973 | Krueger | 83/423 |

*Primary Examiner*—Donald R. Schran

[57] ABSTRACT

The device includes a frame, a pair of circular blades having overlapping peripheral portions, and means for conveying tree lengths transversely toward the blades. The conveying means cooperate with a first blade to move the tree lengths to the overlapping peripheral portions of the blades where they are subject to a shear cutting action.

12 Claims, 5 Drawing Figures

CIRCULAR SHEAR CUTTING DEVICE

FIELD OF THE INVENTION

The present invention relates to a device for cutting tree lengths into logs of a pre-determined length and more particularly to subject these tree lengths to a shear slashing action.

BACKGROUND OF THE INVENTION

Presently, tree lengths are conveyed to a sawing station and are cut into logs by means of a toothed rotary saw or by means of a chain saw. Such tree cutting equipment grinds a portion of each tree length and saw dust formed from a continuously operating industrial tree cutting machine is of considerable amount which is not to be neglected. Thus, for each tree which is sawed, valuable material is wasted.

OBJECTS OF THE INVENTION

It is therefore an object of the present invention to increase the production of wood processing equipment by eliminating this loss of material for each cut of a tree length. This is principally achieved by substituting the milling operation of chain or rotary saws by the shear action of two overlapping circular blades.

It is a further object of the present invention to provide a circular shear cutting device which is adapted to subject tree lengths to such shear slashing action. This is accomplished by having tree length conveying means cooperating with the blades so that tree lengths may be moved to the overlapping shearing edges of the blades.

Other objects and further scope of applicability of the present invention will become apparent from the detailed description hereinafter; it should be understood however that the detailed description, while indicating preferred embodiments of the invention, is given by way of illustration only, since various changes and modifications within the spirit and scope of the invention will become apparent to those skilled in the art from the detailed description.

SUMMARY OF THE INVENTION

These objects are accomplished according to the present invention by the provision of a circular shear cutting device which comprises: a frame; a pair of circular blades rotatably mounted on the frame, each blade including a peripheral portion provided with a cutting edge, the peripheral portions of the blades being in partially overlapping relation to one another; first drive means for rotating the blades; means for successively conveying tree lengths transversely to the pair of blades; second drive means causing the conveying means to advance tree lengths to a first of said pair of rotating blades, the conveying means cooperating with the first blade to move the tree lengths to the overlapping peripheral portions of the blades where tree lengths are subject to a shear slashing action when passing the overlapping peripheral blade portions.

Advantageously, the cutting device further comprises means upstream of the blades for moving the tree lengths in a direction transverse to the direction of travel of the conveying means so that accurate positioning of the tree lengths, as they are conveyed to the cutting blades, may be obtained to form logs cut with a uniform pre-determined length.

Furthermore, the frame of the cutting device has an adjustable portion on which one of the blade is mounted so that fine adjustment of the blades relative to one another may be obtained.

In another preferred form of the cutting device, means are provided for maintaining the tree lengths in a substantial horizontal plane during the shearing operation.

DESCRIPTION OF PREFERRED EMBODIMENTS

Figure 1:
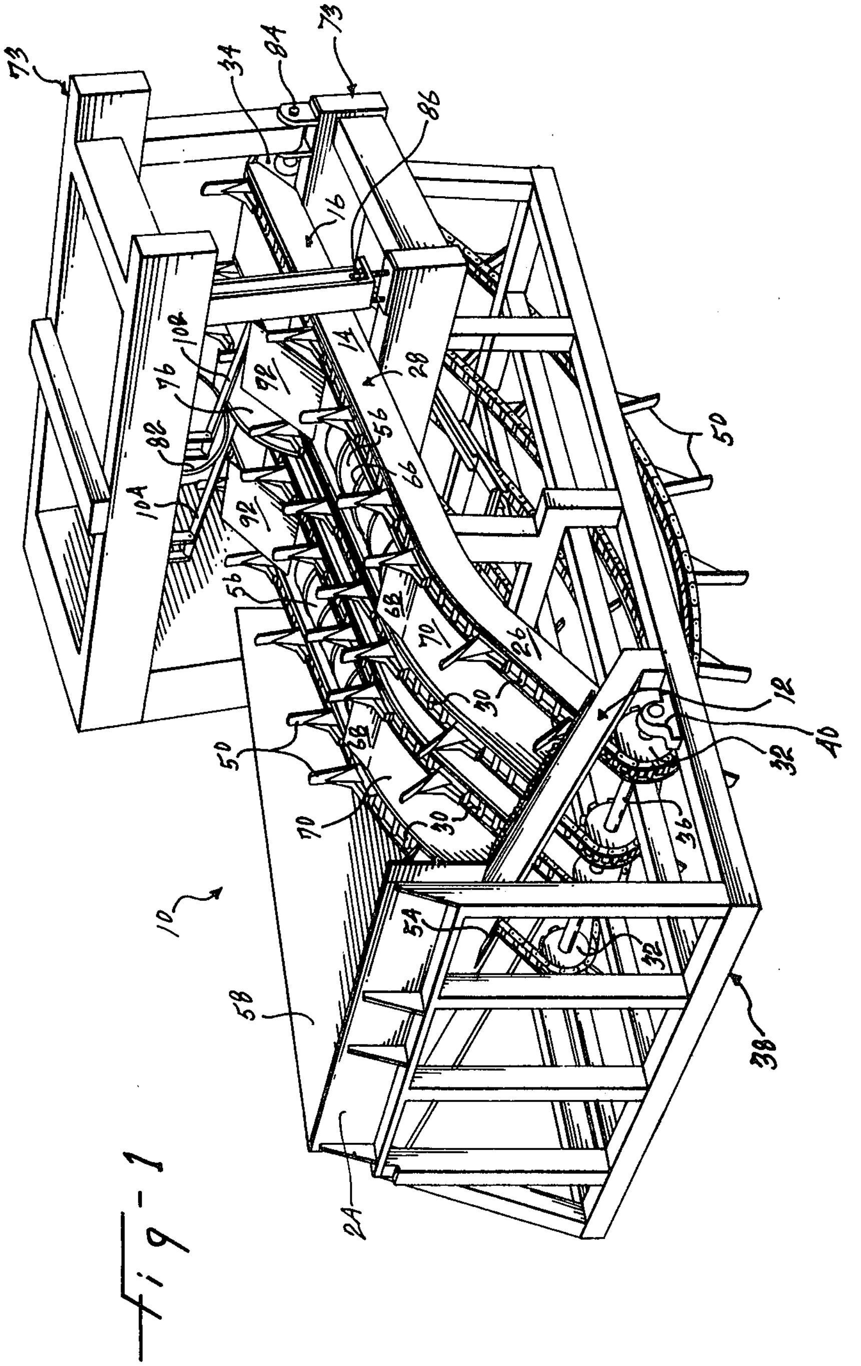
FIG. 1 is a top perspective view of a preferred embodiment of a circular shear cutting device in accordance with the present invention.

Referring to FIG. 1 of the drawings, there is shown a preferred embodiment of a circular shear cutting device 10 in accordance with the present invention. The cutting device 10 is structurally framed and includes a first station 12 for receiving tree lengths of varying size, a second station 14 for successively conveying tree lengths taken from the loading station and a third station 16 where tree lengths are cut into logs of a shorter length.

Figure 2:
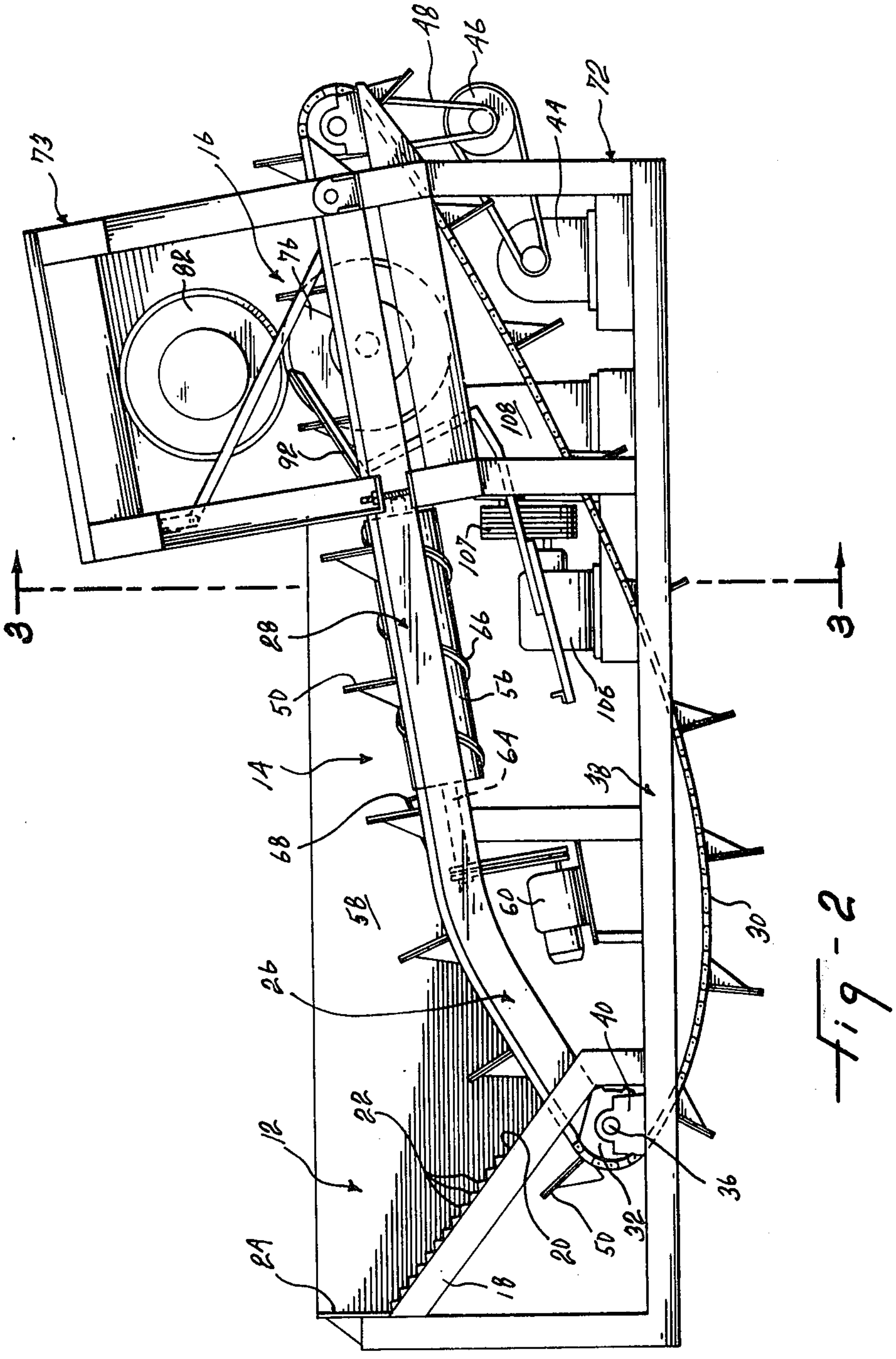
FIG. 2 is an elevational view of the cutting device shown in FIG. 1.

Referring to FIG. 2, loading station 12 includes an inclined platform 18 having a flat surface 20. A series of transversely extending inverted V-shaped members 22 are fixed on a portion of surface 20 and serve to provide friction on the platform surface and to retard downward movement of the tree lengths on the platform when loaded sidewise to the loading station. Yet, tree lengths may also be loaded endwise on the platform over the end panel 22.

The conveying station 14 includes a frame, having a first inclined portion 26 and a second less inclined portion 28, on which conveying means are mounted. These conveying means consist of a series of endless chains 30, each mounted on opposite ends of the frame on idler sprockets 32 and drive sprockets 34. The idler sprockets 32 are mounted on a common axis 36 appropriately supported on a lower horizontal frame 38 of the device 10 by appropriate bearing means 40. The drive sprockets 34 are also mounted on a common axis 42 which is rotatably driven by a motor 44 through appropriate chain or belt means 46 and 48. A number of chains 30 (four shown in the drawings) are mounted in transversely spaced parallel arrangement and their quantity will evidently vary depending on the size of the device 10 and of the tree lengths to be cut. A plurality of longitudinally spaced tree length pushing plates 50 are fixed to each chain 30. The space between each pushing plate on a chain may vary; however, the plates of one chain should be transversely aligned with corresponding pushing plates on the other chains in order to insure that each plate contacts the tree length as it is being conveyed to the cutting station 16. In the embodiment illustrated in the drawings, plates 50 are fixedly mounted to blocks 52 which, in turn, are securely attached to chains 30. The inclined surface 20 of the loading station 12 includes a series of openings 54 (see FIG.

4) to allow passage of plates 50 after having turned around idler sprockets 32. The lower frame 38 is adapted to be mounted on supports (not shown) in a manner that the plates of the lower run of chains 30 may avoid contact with the floor or ground on which device 10 is located. The inclination of the frame portion 26 must be such as to prevent an accumulation of tree lengths on the plates 50. Frame portion 28 is less inclined than frame portion 26 but its inclination should be sufficient to ensure that the tree lengths rest against the pushing plates 50.

It will be evident to persons skilled in the art to provide other type of conveying means for bringing tree lengths to the cutting station.

To ensure that the tree lengths be cut at a uniform length, the conveying means further include a pair of drums 56 longitudinally extending on its frame portion 28. These drums are provided to contact the tree lengths as they are being conveyed and to impart to them a transverse movement toward the sidewall 58 of the device 10. These two drums 56 are drivingly rotated by means of a motor 20, supported on the lower frame 38, through appropriate pulleys 62 and shafts 64. On each drum, there is provided a helicoidal rib 66 which runs on the outer surface thereof and which is of sufficient rigidity to contact the longitudinally moving tree lengths and to impart thereto a lateral movement toward wall 58. As long as the tree lengths advance on the drum 56, there is imparted a continuous lateral movement forcing the tree lengths to remain in endwise contact engagement with sidewall 58. The upstream end of the drum slightly extends (see FIG. 2) above the plane that includes the chains 30, two slopes 68 are mounted on the frame 28 so that, as tree lengths are being conveyed from frame portion 26, they contact slopes 68 and are lifted to then drop on the drum surfaces. In FIG. 1, slopes 68 are shown fixed at the upper end of two platform surfaces 70 of the frame portion 26.

Figure 3:
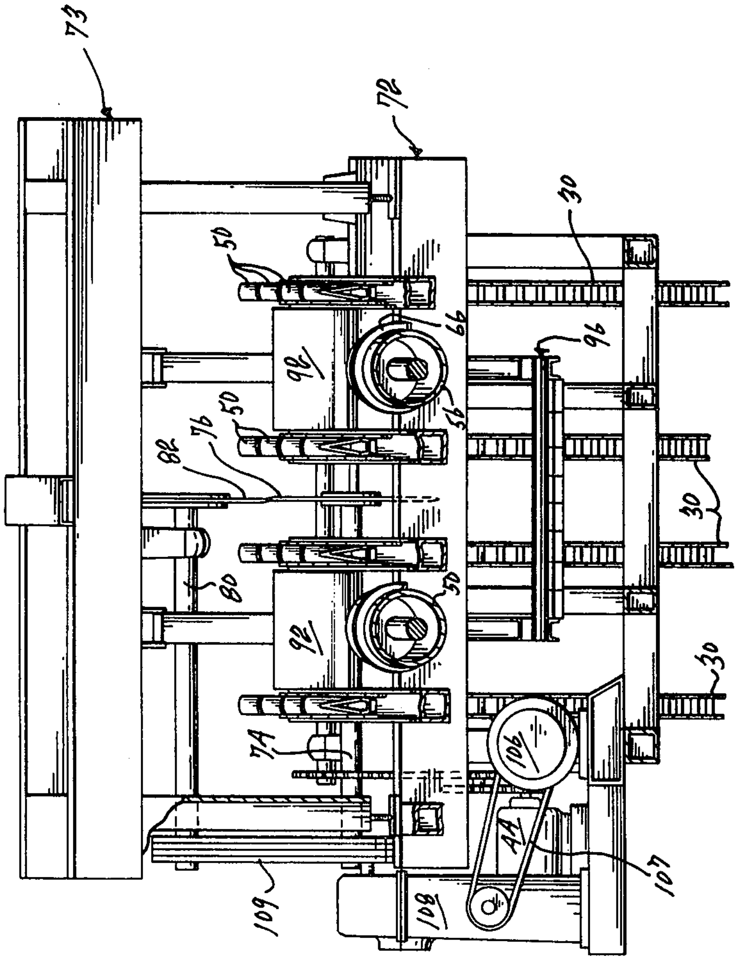
FIG. 3 is a cross-sectional view taken along lines 3—3 of FIG. 2.
Figure 4:
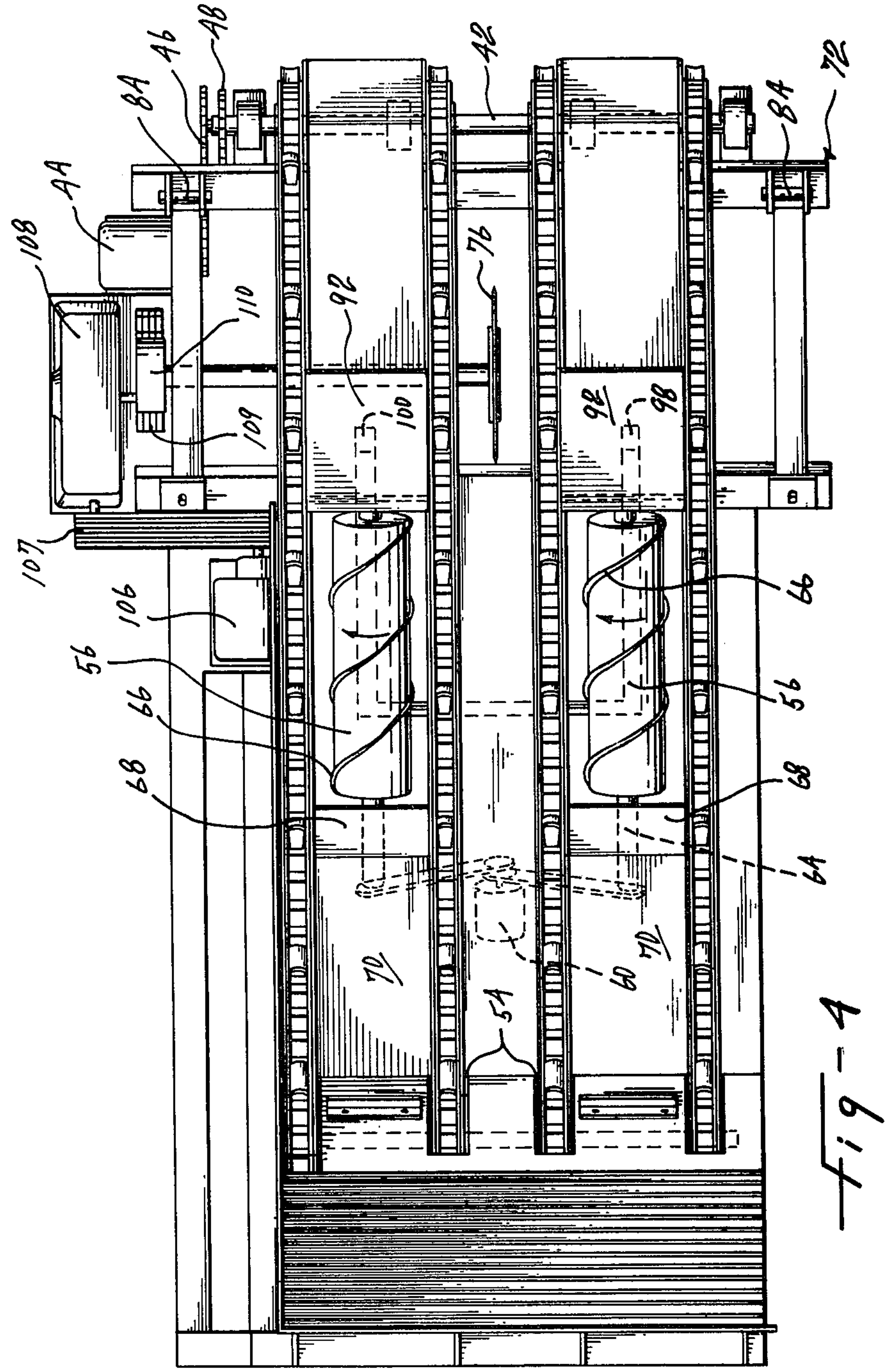
FIG. 4 is a top plan view of the cutting device of the present invention with the adjustable portion of the frame being removed.

The tree cutting station of device 10 includes a frame that consists of a fixed lower portion 72 and an adjustable upper portion 73. The upper frame 72 carries a horizontal shaft 74 supporting centrally of the frame a circular blade 76. The upper frame 73 carries also a horizontal shaft 80 supporting centrally of the frame a second circular blade 82. Each blade has a peripheral portion 76*a*, 82*a* provided with a cutting edge 76*b*, 82*b* (see FIG. 5). As can be seen in FIG. 3, the peripheral portions of the blades are disposed in overlapping arrangement. Satisfactory results are obtained with an overlap of ⅜ inch with tree lengths up to 20 inches in diameter. However, due to wear, the overlapping distance may vary; accordingly, the blades may be adjusted relative to one another. This is achieved by adjusting the upper frame 73 relative to the lower frame 72. Referring to FIGS. 1 and 4, the uppper frame 73 is pivotally mounted at 84 and may be adjusted by operating on the bolt arrangements 86.

Figure 5:
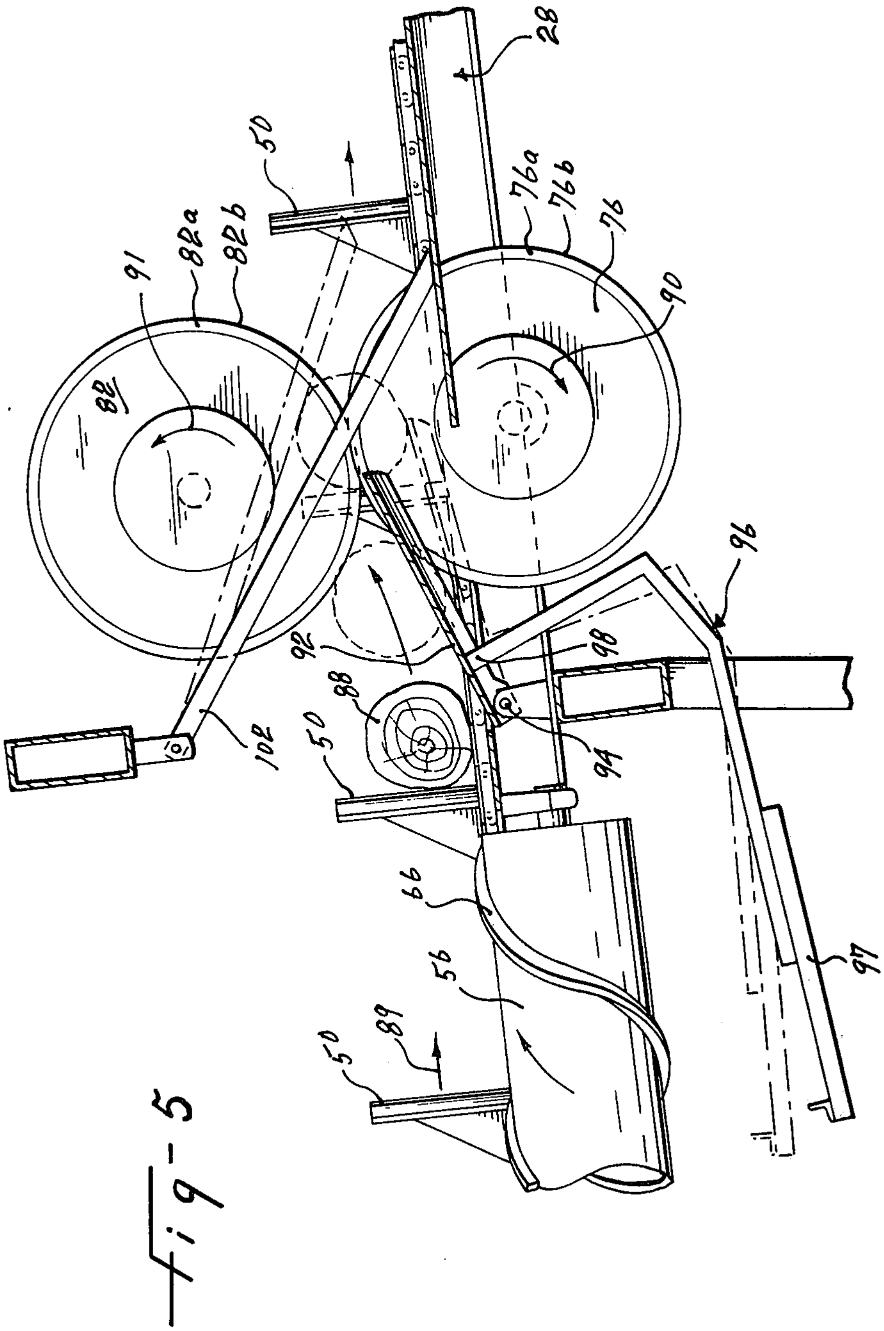
FIG. 5 is an enlarged fragmentary view of one portion of the tree cutting device of the present invention.

Referring to FIG. 5, there will now be described the displacement and cutting of a tree length 88 as it is conveyed by plates 50 in the direction of arrow 89. Drums 56 have caused the tree length to contact sidewall 58. Plates 50 push the tree length towards the blades 76 and 82 which are both rotating in the directions indicated by reference numerals 90 and 91, respectively. As soon as tree length 88 contacts the rotating blade 76, it becomes squeezed between the plates and the blade, the latter imparting to the tree length a lifting action to contact the rotating upper blade 82. As plate 50 continues to advance in the direction of arrow 89, the cutting edges 76*b* and 82*b* of peripheral portions 76*a* and 82*a* penetrate in the tree length slashing it in a shear operation.

It is quite obvious that tree lengths, having a radius corresponding to the distance between the overlapping portions of the blades and the frame 28, may contact both blades simultaneously and the same shear cutting operation will be carried out.

For those tree lengths 88 which contact first the lower blade 76 with subsequent lifting action, there is provided means for ensuring that the tree length will remain in a substantially horizontal plane as it is raised from frame 28. In such case, the tree length is only supported on one point, i.e. the cutting edges of the blades which are practically coplanar. These balancing means consist of two pivotally mounted plates 92 which are provided on each side of the blades. Referring to FIG. 5, these plates 92 are mounted to frame 28 by means of a pivot axis 94. To provide a counterweight effect on these plates 92, a generally U-shaped structure 96 has one portion 97 extending beneath the conveying station and its two opposite extremities 98 and 100 fixedly secured to the undersurface of plates 92.

Referring to FIGS. 1 and 5, there is also provided on opposite sides of the blades two guide bars 102 and 104 which have one end pivotally mounted to the upper frame 73 and which have their opposite free end resting on frame 28. These bars serve to prevent the cut logs to be projected upwardly after having passed the shear blades and to re-direct them onto frame 28.

Referring to FIGS. 2 and 4, there is provided on the lower frame 38 a motor 106 to provide rotational drive to shafts 74 and 80 supporting blades 76 and 82, respectively, via belt means 107, speed reducing mechanism 108 and belt means 109. It is pointed out that the sprockets (one of which is shown as 110 in FIG. 4) which are engaged by belt means 109 should be made adjustable to take the variation in distance when shaft 80 is adjusted relative to shaft 74 when adjustment is required for the overlapping portions of the blades. As an example, satisfactory results have been obtained when the rotational speed of the blades is reduced to 50 turns per min. while the speed of the chains is 125 feet per min.

What is claimed is:

1. A circular shear cutting device for cutting tree lengths comprising: a frame; a pair of circular shear blades rotatably mounted on said frame, each said blade including a periheral portion provided with a continuous cutting edge, the peripheral portions of said blades being in partially overlapping relation to one another; first drive means for rotating said blades in opposite direction to one another; means for successively conveying tree length transversely to said pair of blades; second drive means causing said conveying means to advance tree lengths to a first of said pair of rotating blades, said conveying means cooperating with at least one of said blade to move said tree lengths to the overlapping peripheral portions of said blades where said cutting edges gradually penetrate the conveyed tree length to effect a shear cutting action therethrough.

2. A device as defined in claim 1, further comprising means located upstream of said blades for moving said tree lengths in a direction transverse to the direction of travel of said conveying means.

3. A device as defined in claim 2, wherein said means located upstream for moving tree lengths transversely include: drum means extending longitudinally in said direction of travel of said conveying means, said drum means having on the outer surface thereof a helicoidal rib for engaging said tree lengths, and stop means extending longitudinally on one side of said conveying means for stopping the transverse movement of said tree lengths, said stop means being so disposed as to allow said tree lengths to be cut at a predetermined uniform length.

4. A device as defined in claim 1, wherein said conveying means include a plurality of transversely spaced parallel endless chains each equipped with longitudinally spaced tree length pushing means; each pushing means of one chain being transversely aligned with a pushing means of the other chains.

5. A device as defined in claim 1, wherein said frame includes a portion supporting said conveying means; said frame portion including a first loading section having an inclination and a second conveying section of less inclination than that of said first loading station.

6. A device as defined in claim 5, further comprising a loading station adjacent said loading section of said frame portion.

7. A device as defined in claim 6, wherein said loading station includes an inclined platform having a series of transversely extending guide members to assist in directing the tree lengths transversely on said platform.

8. A device as defined in claim 1, wherein said frame includes a base portion and an upper portion adjustably mounted to said base portion; said first blade being mounted on a horizontal shaft supported on said base portion; the other of said blades being mounted on a second horizontal shaft supported on said upper portion, whereby the peripheral portion of said other blade may be adjusted relative to the peripheral portion of said first blade by adjusting said upper portion relative to said base portion.

9. A device as defined in claim 1, further comprising means for maintaining said tree lengths in a plane perpendicular to the planes of said blades as said peripheral portions of said blades cut through said tree lengths to form tree logs.

10. A device as defined in claim 9, wherein said maintaining means include a pair of inter-connected plates pivotally mounted on said frame on opposite sides of said blades, the pivotal movement of said blades being determined by the diameter of said tree lengths passing said blades.

11. A device as defined in claim 9, further comprising means for directing said tree logs onto said conveying means after having been cut.

12. A device as defined in claim 3, further comprising deflecting means mounted on said frame, upstream of said drum means for directing said tree lengths above said rib prior to being engaged by said drum means.

* * * * *